United States Patent [19]
Gretz et al.

[11] Patent Number: 5,903,757
[45] Date of Patent: May 11, 1999

[54] MONITORING AND HANDLING OF EXCEPTION CONDITIONS IN COMPUTER SYSTEM

[75] Inventors: Edward Gretz, Vestal; David Allan Hellenga, Endwell; Richard Kevin Hill, Endicott, all of N.Y.

[73] Assignee: International Business Machines Corporation, Armonk, N.Y.

[21] Appl. No.: 08/727,207

[22] Filed: Oct. 8, 1996

Related U.S. Application Data

[63] Continuation of application No. 07/943,083, Sep. 10, 1992, abandoned.

[51] Int. Cl.⁶ ..................................................... G06F 9/45
[52] U.S. Cl. ............................................................. 395/704
[58] Field of Search .............................. 395/184.01, 704; 364/267.8, 264, 264.1, 264.2, 264.4; 385/704

[56] References Cited

U.S. PATENT DOCUMENTS

| | | | |
|---|---|---|---|
| 3,599,091 | 8/1971 | Warner | 324/73 |
| 4,183,083 | 1/1980 | Chatfield | 364/200 |
| 4,768,149 | 8/1988 | Konopik et al. | |
| 4,849,879 | 7/1989 | Chinnaswamy | 364/200 |
| 4,875,160 | 10/1989 | Brown | |
| 4,914,657 | 4/1990 | Walter et al. | |
| 5,088,032 | 2/1992 | Bosack | 395/200 |
| 5,247,687 | 9/1993 | Eilert | 395/775 |

*Primary Examiner*—James P. Trammell
*Assistant Examiner*—Peter J. Corcoran, III
*Attorney, Agent, or Firm*—Arthur J. Samdovitz

[57] ABSTRACT

A computer system monitors a variety of conditions indicating levels to which different components, services and resources are being utilized, and based on these levels, determines a measure of overall system utilization. By way of example, the conditions are CPU utilizations dispatcher queue length, number of active users, number of users in an I/O wait queue and the paging rate. The system determines and repeatedly updates a data value for each of the conditions representing a respective amount of utilization. Then, the system determines a weighted summation based on the latest update of the data values and a significance of each of the data values in indicating system utilization. Next, the system compares the weighted summation to two or more thresholds, and determines and performs an action based on the comparison of the weighted summation to the thresholds. The system determines and performs a relatively severe action when the weighted summation exceeds the greatest of the thresholds and a relatively moderate action when the weighted summation is less than the greatest of the thresholds but greater than least one other of the thresholds. Thus, the action is commensurate with the overall utilization of the computer system.

4 Claims, 2 Drawing Sheets

MONITORING AND HANDLING OF EXCEPTION CONDITIONS IN COMPUTER SYSTEM

The application is a continuation of application Ser. No. 07/943,083, filed Sep. 10, 1992, now abandoned.

BACKGROUND OF THE INVENTION

The invention relates generally to computer operating systems, and deals more particularly with monitoring and handling of excessive demands on a CPU or services or resources within a computer system.

A computer system comprises many components, services and resources that support users/application programs. For example, every computer system includes one or more central processing units (CPUs) to execute application programs. Also, most computer systems include some type of operating system service to dispatch (i e. schedule) program tasks or threads for executions Also, most computer systems include I/O devices or resources such as DASD or printers for use by the application programs. Naturally. the speed that each components service and resource can serve a request is limited, and while the components service or resource is serving one requests other requests for the same components, service or resource may have to wait. The amount of waiting that can be tolerated and the penalty for waiting depend on the nature of the components, service or resource for which service is requested, the type of requester, and demands on other components, resources and services within the computer systems However, at some level or levels of waiting or utilization of the components, services and resources, system performance becomes unacceptable and safeguards must be installed to avoid such overuse of the computer system.

It was previously known to continuously monitor the demands on or utilizations of different components, services or resources such as CPU utilization., dispatcher queue length, number of active users, number of users in I/O wait queue and paging rate. When the demand or utilization exceeds a respective threshold for any individual component, service or resource the computer system signals the condition.

A drawback of this system is that each response is limited to demands on the respective individual component, service or resource irrespective of demands on the other components, services or resources, and this may not accurately represent overall system utilization/demand.

Accordingly, a general object of the present invention is to provide an exceptional condition handling system which more accurately and completely represents the composite level and nature of different types of demands on the computer system.

Another general object of the present invention is to provide an exceptional condition handling system which provides different types of responses depending on the level and nature of the demands on the computer system.

SUMMARY OF THE INVENTION

The invention resides in a computer system which monitors a variety of conditions indicating levels to which different components, services and resources are being utilized, and based on these levels, determines a level of overall system utilization. By way of examples the conditions are CPU utilization, dispatcher queue lengths number of active users, number of users in an I/O wait queue and the paging rate. The system determines and repeatedly updates a data value for each the conditions representing a respective amount of utilization. Then, the system determines a weighted summation based on the latest update of the data values and a significance of each of the data values in indicating system utilization. Next, the system compares the weighted summation to a threshold, and determines and performs an action based on the comparison of the weighted summation to the threshold.

According to one feature of the invention in addition to the comparison of the weighted summation to the thresholds each of the individual data values is also compared to a respective threshold and an action is taken if the individual data value exceeds the threshold, This assures that if an individual data value is excessive, that appropriate action is taken irrespective of the weighted average.

According to another feature of the inventions, the system compares the weighted summation to at least two different thresholds, and determines and performs a relatively severe action when the weighted summation exceeds the greatest of the thresholds and a relatively moderate action when the weighted summation is less than the greatest of the thresholds but greater than at least one other of the thresholds. Thus, the action is commensurate with the overall utilization of the computer system.

DESCRIPTION OF THE PREFERRED EMBODIMENTS

Figure 1:
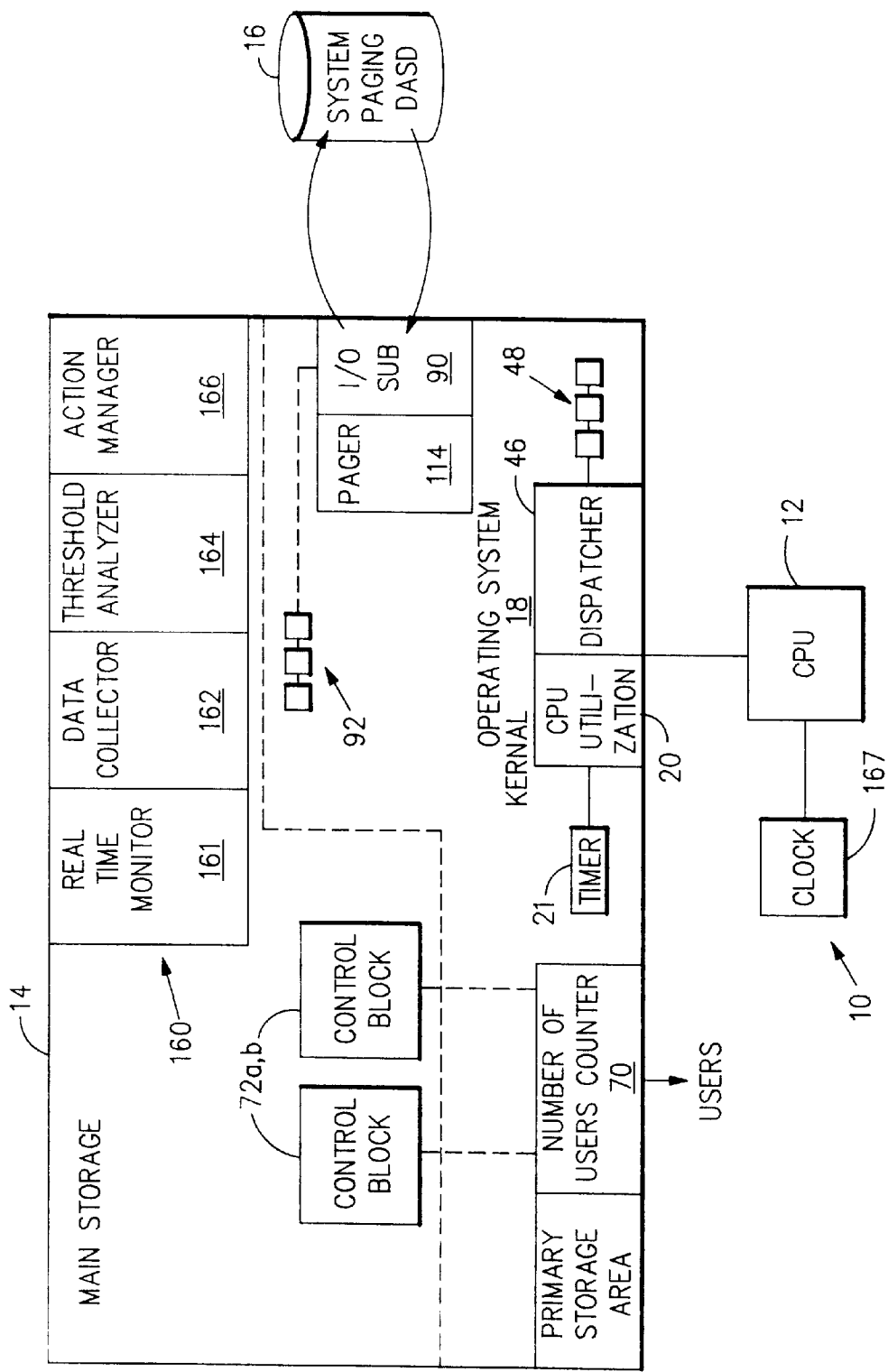
FIG. 1 is a block diagram of a computer system that incorporates the present invention.

Referring now to the drawings in detail wherein like reference numerals indicate like elements, FIG. 1 illustrates a computer system generally designated 10 according to the present invention. Computer system 10 comprises a CPU 12, main storage 14 and system paging DASD 16. An operating system kernel 18 is stored in main storage. By way of examples operating system kernel 18 is similar to a prior art IBM VM/ESA 1.0 operating system which is described in detail in a publication entitled "VM/ESA General Inform" ation and available from International Business Machines Corporation at Mechanicsburg, Pa. by order number GC24-5550-02.

The present invention uses data values for various conditions such as CPU utilization, dispatcher queue length, active number of users, number of users in I/O wait, and paging rate to determine a system response as described in detail below. These data values are generated by pre-existing components and functions within system 10, and indicate the level of utilization of the respective component, resource or service. The data values are updated at various times, i e. periodically, based on program cycling or when the value changes. The following is a description of the pre-existing components and functions which generate the data values.

Operating system kernel 18 includes a CPU utilization monitoring function 20 which determines the CPU utilization percentage as follows. Function 20 records the amount of time that the CPU is in actual use executing program steps by advancing a timer 21 whenever the CPU is in actual use. Periodically, function 20 system reads the timer value and calculates the CPU utilization percentage by dividing the timer value by the maximum CPU utilization time during the interval. By way of example, the interval is three minutes. Then, function 20 stores the percentage, and resets the timer for use during the next interval. The stored percentage is updated after each interval.

Operating system kernel 18 also includes a dispatcher program function 46 to schedule program tasks or threads for execution by the CPU 12 (or multiple CPUs). The tasks or threads are scheduled based on a priority level associated with the task or threads the time required to execute the task or thread, and other factors unrelated to this invention. If the CPU is not immediately available to execute a task or threads then the task or thread is placed on a dispatch queue 48. Tasks or threads on the queue are removed for execution. Function 46 also counts and stores the number of tasks or threads on the queue, and updates the queue length value whenever, a task or thread is added to or removed from the queues. Thus, the dispatcher queue length value is updated as the queue changes (and not periodically as is the percent of CPU Utilization.)

Operating system kernel 18 also includes a function 70 which monitors the number of active users as follows. As each user "logs-on" the system, the function 70 creates a control block 72a or b to represent the user. Conversely, whenever a user logs-off the systems the user's control block is deleted. The function 70 also increments a number of active users count whenever a new control block is added and decrements the count when the control block is deleted.

Operating system kernel 18 also includes an I/O subsystem 90 which controls access to DASD 16. The I/O subsystem receives requests for read and write access to the DASD. When the I/O subsystem is busy with an I/O operations other I/O requests are queued in an I/O wait queue 92 for subsequent processing. The I/O wait queue consists of a sequence of linked control blocks. Whenever an I/O request is added to the queue 92, an I/O wait queue count is incremented. Conversely, whenever an I/O request is removed from the queue (for processing), the I/O wait queue is decremented.

Operating system kernel 18 also includes a paging function 114 which reads pages of data from and writes pages of data to system paging DAS 16. By way of examples each page is 4096 bytes of data. The paging function also measures the paging rates i.e. the number of pages that are read from or written to main storage during a unit of time. Every time a page is read from or written to DASD 16, a page count is incremented. After every predetermined unit of time the paging rate is determined by dividing the page count by the time unit. Then, the page count is reset.

It should be noted that while system 10 monitors five significant conditions as described above, the invention is not limited to the particular conditions which are monitored and handled, but can be used to monitor and handle a wide variety of conditions.

The following is a description of an exceptional condition handler 160, according to the present invention. Handler 160 may be part of the operating system or an application program executing on CPU 12. Handler 160 comprises a real time monitor 161, a data collector 162, a threshold analyzer 164, and an action manager 166. The real time monitor is also found in prior arts and in system 10, periodically collects data from functions 20, 46, 70, 90 and 114. As described in more detail below with reference to FIG. 2, at predetermined intervals calculated from a system clock 167, the-data collector. collects the latest data values for the foregoing functions from the real time monitor. However, if desired, the data collector can collect other data values directly from other sources within the operating system. The data values for the foregoing functions indicate CPU utilization, dispatcher queue length, number of active users, number of users in I/O wait and the paging rate. Thus, the data collector collects a "snap shot" of the current value for each of the data elements which data elements were updated at various times and/or upon various events. This snap shot of the latest value for multiple conditions is important to provide accurate bases for the weighted summation described below. The data collector furnishes the latest data values to the threshold analyzer, Then, the threshold analyzer compares the data values individually to one or more respective thresholds to determine if any one of the data values is too high (or too low, if the threshold is a minimum) Then, the threshold inalyzer calculates weighted summations based on more than one of the data values to determine if the data values for more than one data element, when taken as a wholes represent excessive utilization of the computer system. In the preferred embodiment of the inventions each of the addends in the weighted summation is based on the result of a comparison of the respective data value to one or more predetermined thresholds. The addend amount is based on which threshold is exceeded by the respective data value. The threshold for each of the data elements reflects the significance of each occurrence or incremental level of the data element or condition in the overall system utilization. The thresholds for the different data elements are usually different than each other. Thus, the thresholds provide a "weighting" factor for the respective data element or condition. However, alternately, still in keeping with the invention, the "raw" data values for all data elements or conditions could be multiplied by respective weights and added together to yield the weighted summation. In such case, the weights also reflect the relative importance of each occurrence or incremental level of the respective data element or condition in evaluating overall utilization of the computer system. After the weighted summation is calculated in either scenario. the weighted summation is compared to one or more threshold to determine the overall level of system utilization.

The results of the comparisons of the individual data values to the respective thresholds and the result of the comparison of the weighted summation are supplied to the action manager to determine what actions to take. The actions include setting of indicator lights or invoking routines to reduce system utilization or increase system services and resources. The action manager bases the actions separately on the compari sons of individual data values and the comparisons of the weighted summation. The actions taken are commensurate with the magnitude of the thresholds which are exceeded by each of the individual data values and the weighted summation.

Figure 2:
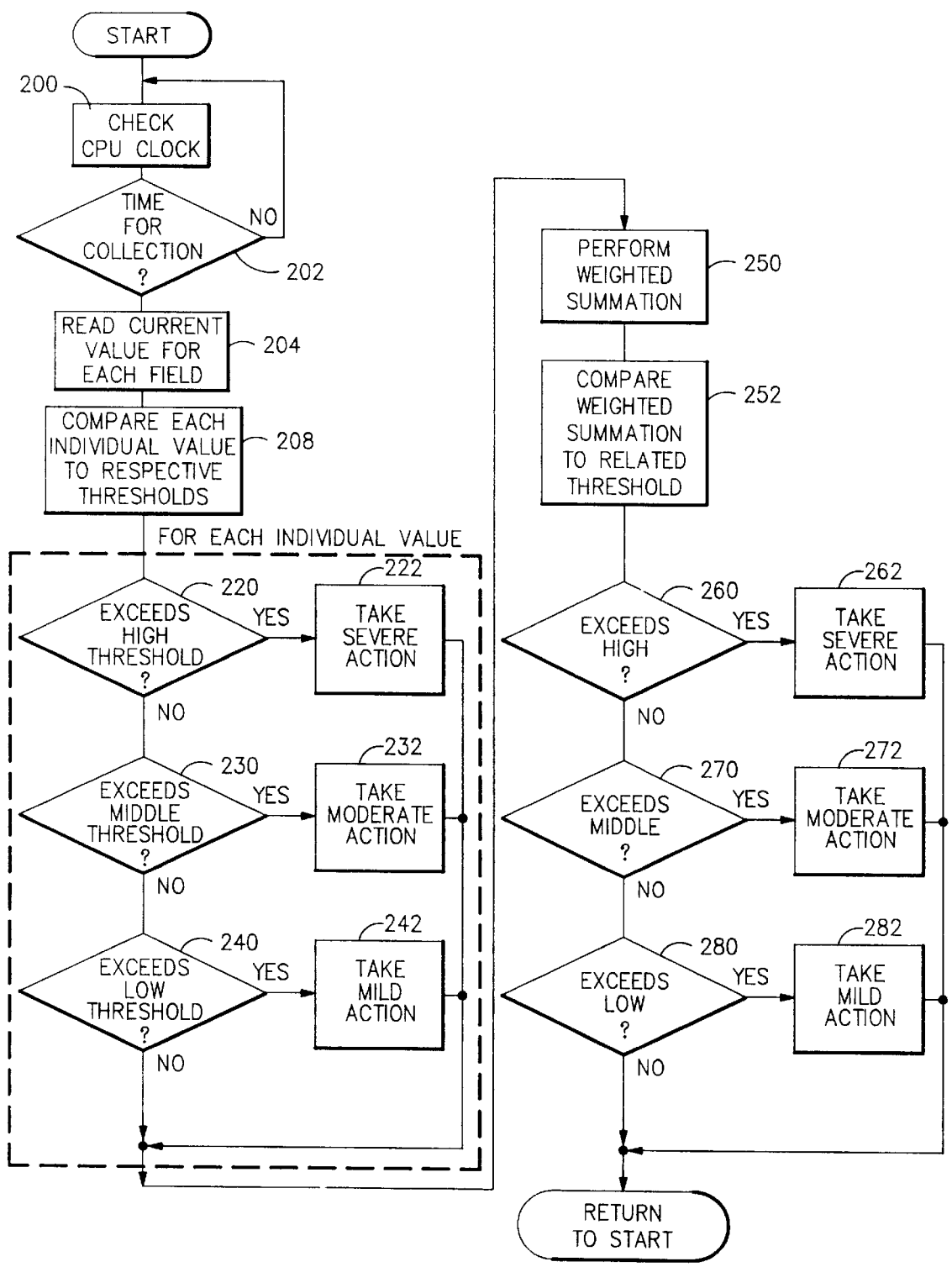
FIG. 2 is a flow chart of an exceptional condition handling portion of an operating system within the computer system of FIG. 1 that implements the present invention.

FIG. 2 illustrates in detail the flow of the exceptional condition handler 170. In step 200, the data collector 162 reads the system clock 201 and then determines if the predetermined interval has elapsed since the last data collection (decision 202). If so, the data collector collects the latest or current value of the foregoing data, i.e. CPU utilizations dispatcher queue length, number of active users, number of users in I/O wait and the paging rate (step 204). Then, the threshold analyzer 164 compares each data value individually to three respective thresholds (step 208). If any of the data elements exceeds the highest of the three respective thresholds (decision 220), then the action manager 166 takes a respective "severe" action (step 222). If any of the data elements is below the highest respective threshold but greater than the middle respective threshold (decision 230), then the action manager takes a respective "moderate" action (step 232). If any of the data elements is below the middle respective threshold but greater than the low respective threshold (decision 240), then the action manager takes a respective "mild" action (step 242). The following table lists examples of the three respective thresholds for each of the five data elements, and the respective actions:

| CONDITION | THRESHOLD VALUE | MILD ACTION |
|---|---|---|
| CPU Utilization | 80% | Display corresponding indicator "WHITE" |
| Dispatcher Queue Length | 15 | Display corresponding indicator "WHITE" |
| Number of Active Users | 350 | Display corresponding indicator "WHITE" |
| Users in I/O Wait Queue | 15 | Display corresponding indicator "WHITE" |
| Paging Rate | 100 | Display corresponding indicator "WHITE" |

| CONDITION | THRESHOLD VALUE | MODERATE ACTION |
|---|---|---|
| CPU Utilization | 90% | Display corresponding indicator "YELLOW" |
| Dispatcher Queue Length | 25 | Display corresponding indicator "YELLOW" |
| Number of Active Users | 550 | Display corresponding indicator "YELLOW" |
| Users in I/O Wait Queue | 25 | Display corresponding indicator "YELLOW" |
| Paging Rate | 300 | Display corresponding indicator "YELLOW" |

| CONDITION | THRESHOLD VALUE | SEVERE ACTION |
|---|---|---|
| CPU Utilization | 99% | Display corresponding indicator "RED" Notify system programmer |
| Dispatcher Queue Length | 40 | Display corresponding indicator "RED" Issue "SET SHARE" command for critical applications |
| Number of Active Users | 750 | Display corresponding indicator "RED" |
| Users in I/O Wait Queue | 40 | Display corresponding indicator "RED" Notify system programmer |
| Paging Rate | 800 | Display corresponding indicator "RED" Issue "SET RESERVE" command for critical applications |

All data values below the lowest respective threshold indicate normal operations and results in no action being taken except that the corresponding indicator is displayed as "GREEN"

The flow chart of FIG. 2 continues with step 250 in which the threshold manager calculates the following weighted summation based on the five data elements:

weighted summation =
  severity level/weight for CPU utilization
  + severity level/weight for dispatcher queue length
  + severity level/weight for active number of users
  + severity level/weight for number of users in I/O wait
  + severity level/weight for paging rate; where the severity level/weight for any of the data elements equals nine if the respective data value exceeds the highest thresholds equals three if the respective data value is less than the highest threshold but exceeds the middle thresholds equals 1 if the respective data value is less than the middle thresholds but exceeds the lowest thresholds and equals zero if the respective data value is less than the lowest thresholds For example,

| Data Element | Data Value | Severity level/weight |
|---|---|---|
| CPU utilization | 95% | 3 |
| Dispatch queue length | 30 | 3 |
| Number of Active Users | 400 | 1 |
| Number of Users in I/O | 10 | 0 |
| Paging rate | 900 | 9 |
| Weighted Summation = | | 16 |

It should be noted that the use of the comparison of each of the data values to the respective individual thresholds has the effect of weighting or "level setting" each of the data elements. For example, a CPU utilization rate of 80% is as significant to overall system utilization as a dispatcher queue length of 15, 350 activer users, 15 users in I/O wait and a paging rate of 100. Similarly, all of the data elements at the respective moderate threshold value are equally significant as each other and all of the data elements at the respective severe threshold value are equally significant as each other.

Alternately as described above, the raw data values for each of the data elements or conditions could be multiplied by a respective weighting factor to reflect a different relative importance of each occurrence or incremental level of the respective condition and then the weighted data values added together to form the weighted summation. The weighting factors in either scenario can either be preprogrammed into the handler 70 or provided by a user.

After calculating the weighted summation, the threshold analyzer compares the weighted summation to three thresholds (step 252). If the weighted summation exceeds the highest threshold (decision 260), then the threshold analyzer takes a "severe" action (step 262). If the weighted summation is less than the highest threshold but greater than the middle threshold (decision 270), then the threshold analyzer takes a "moderate" action. If the weighted summation is less than the middle threshold but greater than the low threshold (decision 280), then the threshold manager takes a "mild" action. The following table indicates an example of three thresholds for the weighted summation and respective action taken:

| Threshold for Weighted Summation | Action |
|---|---|
| 9 | Display system indicator white. |
| 15 | Display system indicator yellow. |
| 18 | Display system indicator red and notify system programmer. |

Note that the action is commensurate with the magnitude of a combination of the weighted data values and therefore the overall degree to which the computer system is being utilized. In the foregoing example, where the weighted summation equals sixteen, the corresponding response is to display indicator as yellow.

Based on the foregoing, a computer system including an exceptional condition handler according to the present invention has been disclosed. However, numerous modifications and substitutions can be made without deviating from the scope of the present invention. For examples different elements can be considered individually and in a weighted summation to indicate the degree to which the computer system is being utilized or any other conditions and different actions can be taken as appropriate. Therefore, the invention has been disclosed by way of illustration and not limitation and reference should be made to the following claims to determine the scope of the present inventions.

We claim:

1. A computer system which determines and acts upon a level of utilization of the computer system, said system comprising:

means for monitoring a plurality of different types of conditions indicating utilization of the computer system, and determining a data value for each of said conditions representing a respective amount of utilization:

means for determining a weighted summation based on the pluarity of data values and a significance of each of the data values in indicating system utilization;

means for comparing said weighted summation to at least one threshold; and action means for determining and performing an action based on the comparison of said weighted summation to said threshold or thresholds; and wherein the comparing means compares said weighted summation to at least two different thresholds; and the action means determines and performs a first action when the weighted summation exceeds the greatest of the thresholds and a second action which is less severe than said first action when the weighted summation is less than the greatest of the thresholds but greater than at least one other of the thresholds.

2. A method for determining and acting upon a level of utilization of a computer system, said method comprising the computer implemented steps of:

monitoring a plurality of different types of conditions indicating utilization of the computer system;

determining a data value for each of said conditions representing a respective amount of utilization;

determining a weighted summation based on said plurality of data values and a significance of each of the data values in indicating system utilization;

comparing said weighted summation to at least one threshold; and determining and performing an action based on the comparison of said weighted summation to said threshold or thresholds; and wherein the weighted summation is compared to at least two different thresholds; and the action is a first type when the weighted summation exceeds the greatest of the thresholds and a second type when the weighted summation is less than the greatest of the thresholds but greater than at least one other of the thresholds, said second type being less severe than said first type.

3. A computer system which determines and acts upon a level of utilization of the computer system, said system comprising:

means for monitoring a plurality of conditions indicating utilization of the computer system, and determining a data value for each of said conditions representing a respective amount of utilization;

means for determining a weighted summation based on each of the plurality of data values and a significance of the data value in indicating system utilization;

means for comparing said weighted summation to at least two different thresholds; and action means for determining and performing an action based on the comparison of said weighted summation to said thresholds;

and wherein the action means determines and performs a first action when the weighted summation exceeds the greatest of the thresholds and a second action which is less severe than said first action when the weighted summation is less than the greatest of the thresholds but greater than at least one other of the thresholds.

4. A method for determining and acting upon a level of utilization of a computer system, said method comprising the computer implemented steps of:

monitoring a plurality of conditions indicating utilization of the computer system;

determining a data value for each of said conditions representing a respective amount of utilization;

determining a weighted summation based on each of said plurality of data values and a significance of the data value in indicating system utilization;

comparing said weighted summation to at least two different thresholds; and determining and performing an action based on the comparison of said weighted summation to said thresholds;

and wherein the action is a first type when the weighted summation exceeds the greatest of the thresholds and a second type when the weighted summation is less than the greatest of the thresholds but greater than at least one other of the thresholds, said second type being less severe than said first type.

* * * * *